# (12) United States Patent
Moribe et al.

(10) Patent No.: US 7,045,977 B2
(45) Date of Patent: May 16, 2006

(54) VERTICAL/HORIZONTAL AMPLITUDE CONTROLLER

(75) Inventors: Hiroshi Moribe, Hyogo (JP); Nobuo Taketani, Hyogo (JP); Ryuichi Shibutani, Osaka (JP); Masahiro Takeshima, Osaka (JP); Hisao Morita, Osaka (JP); Hiroshi Ando, Osaka (JP); Koji Matsuhira, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 17 days.

(21) Appl. No.: 10/470,829

(22) PCT Filed: Nov. 1, 2002

(86) PCT No.: PCT/JP02/11434

§ 371 (c)(1),
(2), (4) Date: Jul. 30, 2003

(87) PCT Pub. No.: WO03/043309

PCT Pub. Date: May 22, 2003

(65) Prior Publication Data

US 2004/0080286 A1 Apr. 29, 2004

(30) Foreign Application Priority Data

Nov. 12, 2001 (JP) .............................. 2001-345590

(51) Int. Cl.
*G09G 1/04* (2006.01)
(52) U.S. Cl. ..................... 315/386; 315/411; 348/687
(58) Field of Classification Search ............... 315/386, 315/383, 411, 370, 371, 408, 388, 398, 403, 315/389, 395; 348/687, 673, 180, 181, 688, 348/671, 674, 603, 558, 630, 563, 672, 631, 348/731

See application file for complete search history.

(56) References Cited

U.S. PATENT DOCUMENTS

| 4,581,563 A | * | 4/1986 | Rockrohr ..................... 315/388 |
| 5,136,390 A | * | 8/1992 | Inova et al. ................ 348/383 |
| 5,191,421 A | * | 3/1993 | Hwang ........................ 348/687 |
| 5,264,762 A | * | 11/1993 | Wilber ........................ 315/398 |
| 5,504,538 A | * | 4/1996 | Tsujihara et al. ........... 348/673 |
| 5,760,840 A | * | 6/1998 | Tani et al. ................... 348/558 |

(Continued)

FOREIGN PATENT DOCUMENTS

| JP | 61-100073 | 6/1986 |
| JP | 1-119271 | 8/1989 |
| JP | 1-279672 | 11/1989 |
| JP | 6-189152 | 7/1994 |

OTHER PUBLICATIONS

International Search Report corresponding to application No. PCT/JP02/11434 dated Jan. 14, 2003.

*Primary Examiner*—Don Wong
*Assistant Examiner*—Chuc Tran
(74) *Attorney, Agent, or Firm*—RatnerPrestia

(57) ABSTRACT

The vertical/horizontal amplitude control device for controlling a vertical amplitude and a horizontal amplitude of an image display device for displaying a video signal includes a brightness level detector for detecting a brightness level of the video signal, a vertical amplitude controller for controlling the vertical amplitude based on the brightness level, and a horizontal amplitude controller for controlling the horizontal amplitude based on the brightness level. The device controls the vertical and horizontal amplitudes into constant without a delay from a change of a video signal even when the brightness level of the video signal abruptly changes.

9 Claims, 4 Drawing Sheets

U.S. PATENT DOCUMENTS 5,978,040 A * 11/1999 Diamant ............... 348/556
5,978,041 A * 11/1999 Masuda et al. ........... 348/563
6,377,313 B1 * 4/2002 Yang et al. ............. 348/630
6,388,716 B1 * 5/2002 Tsuzuki et al. ........... 348/687

* cited by examiner

PRIOR ART

Pedestal Level

High Voltage Down

Screen Size Decrease

Widen Screen Vertically

Vertical Sawtooth Waveform

Widen Screen Horizontally

Pin-Cushion Correction Waveform

Constant Screen Size

VERTICAL/HORIZONTAL AMPLITUDE CONTROLLER

This application is a National Phase Application Under 35 U.S.C. 371, claiming the benefit of PCT/JP02/11434 filed Nov. 1, 2002, which has priority based on Application No. 2001-345590 filed in Japan on Nov. 12, 2001.

TECHNICAL FIELD

The present invention relates to a vertical/horizontal amplitude control device for a cathode-ray tube (CRT) television receiver.

BACKGROUND ART

In association with recent trend toward a larger screen size, a higher picture quality, and a higher quality, it is important that the picture size of a cathode-ray tube (CRT) television receiver be unchanged despite a change of a high voltage. A conventional vertical/horizontal amplitude control device for controlling a change of the picture size due to the change of the high voltage will be described.

FIG. 3 is a block diagram of the vertical/horizontal amplitude control device for controlling vertical and horizontal amplitudes based on the change of the high voltage. A video signal is converted into RGB signals in RGB processor block 31. Amplitudes of the signals are then controlled in gain control block 32, and the video signal is displayed on picture tube 33. A beam current that flows when displaying the video signal is detected as the change of the high voltage. The change of the high voltage is supplied to vertical amplitude control section 34 and horizontal amplitude control section 35. By controlling the vertical amplitude and the horizontal amplitude according to the change of the high voltage, a change of the picture size due to the high voltage change can be reduced. Vertical sawtooth-wave controller 36 controls a linearity of a vertical sawtooth wave and performs an S-character adjustment. Pin-cushion controller 37 performs a waveform control of a pin-cushion waveform.

Since the above sections control vertical and horizontal amplitudes after a beam current flows, that is, after the high voltage changes, the control device cannot correct the amplitudes appropriately because of a delay of control of the vertical and horizontal amplitudes after the change of the high voltage. This causes the change of the vertical and horizontal amplitudes not to be reduced due to the high voltage change.

SUMMARY OF INVENTION

A vertical/horizontal amplitude control device for controlling an vertical amplitude and an horizontal amplitude of an image display device for displaying a video signal includes a brightness level detector for detecting a brightness level of a video signal, a vertical amplitude controller for controlling the vertical amplitude based on the brightness level, and a horizontal amplitude controller for controlling the horizontal amplitude based on the brightness level. The device maintains the vertical and horizontal amplitudes in constant without delay from a change of the video signal even when the brightness level of the video signal has abruptly changed.

DETAILED DESCRIPTION OF PREFERRED EMBODIMENT

Figure 1:
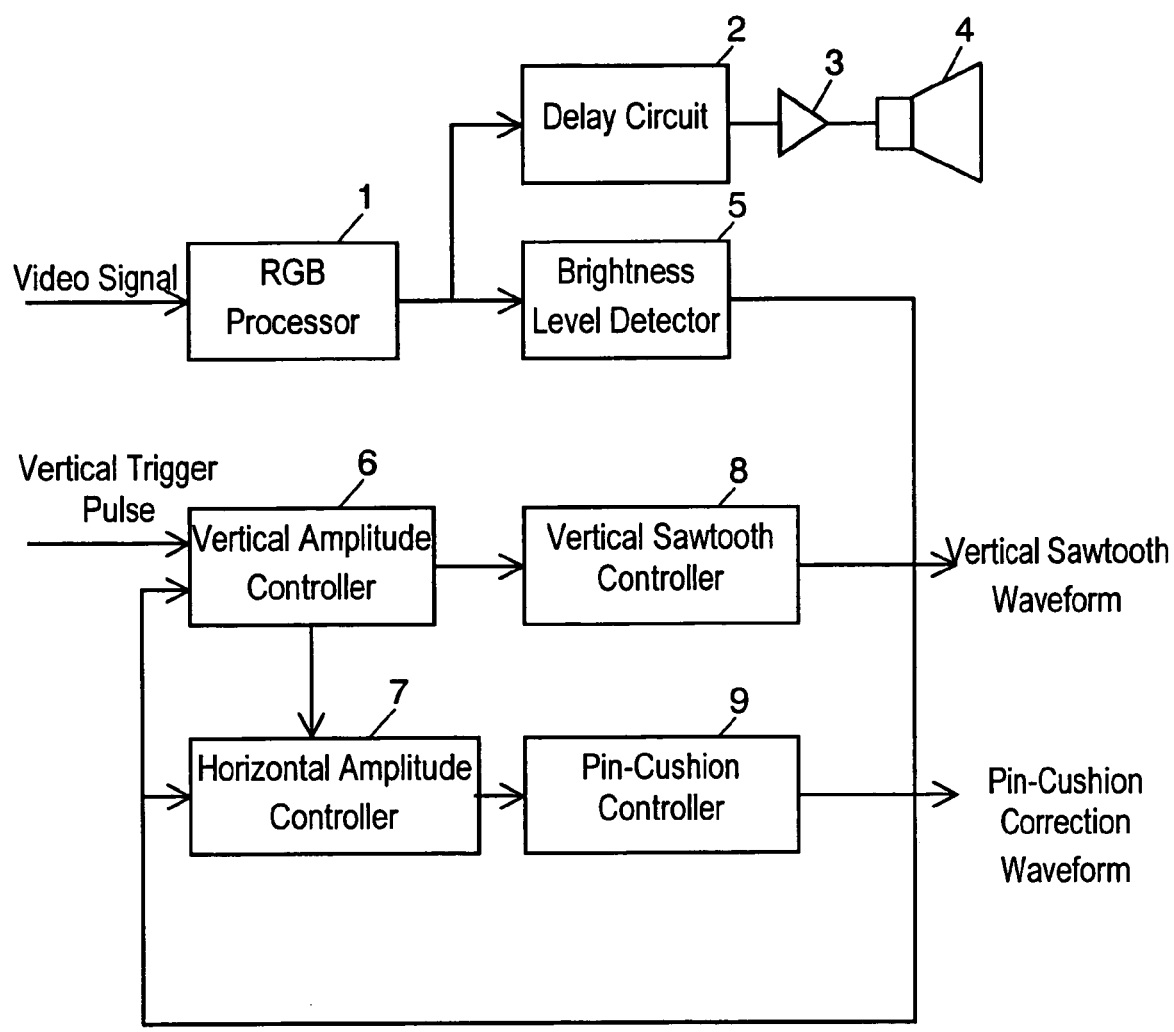
FIG. 1 is a block diagram of a vertical/horizontal amplitude control device according to an exemplary embodiment of the present invention.

FIG. 1 is a block diagram of a vertical/horizontal amplitude control device according to an exemplary embodiment of the present invention. RGB processor 1 generates an RGB signal from a video signal input to the processor by using a matrix, and performs DC control and amplitude control of the video signal. The RGB signal output from RGB processor 1 is transferred through delay line 2 and gain controller 3, and is displayed on a video display device, such as cathode-ray tube (CRT) 4.

Delay circuit 2 cancels a time difference between a change of vertical and horizontal amplitudes due to a change of a high voltage and a correction of the vertical and horizontal amplitudes based on results of a detection of a brightness level. Delays are caused in amplifiers and filters, for example, while signals travel from vertical amplitude controller 6 and horizontal amplitude controller 7 to a vertical deflection and a horizontal deflection, respectively. Consequently, delay circuit 2 is provided in a channel of transmission of the video signal for adjusting a delay time of the RGB signals, so that the timing of correction of the vertical and horizontal amplitudes matches a display on the screen of the CRT. Delay circuit 2 may be omitted if not necessary.

Brightness level detector 5 calculates the brightness level of the RGB signals output from RGB processor 1, that is, the brightness level corresponding to a beam current that is deemed flowing in picture tube 3. The brightness level changes depending on an RGB amplitude adjustment and a black level adjustment. Brightness level detector 5 calculates respective average brightness levels in a short time range (e.g. a horizontal deflection period) and in a long time range (e.g. a vertical deflection period). The average brightness levels can be calculated, for example, by adding the brightness level of each pixel and dividing the sum of the brightness levels by the horizontal deflection period and vertical deflection period, respectively. The levels are output as a result of the detection of the brightness level. That is, the vertical and horizontal amplitudes can be controlled both in the short time range and in the long time range. As a result, the vertical and horizontal amplitudes of the screen are controlled in the short time range in an alternating-current type signal level change while the amplitudes are controlled in the long time range in a direct-current type signal level change.

Brightness level detector 5 detects the average brightness level. Alternatively, the detector may detect a peak, a pattern, a maximum value, a minimum value, or a green output or any of their combination. The detector may detect an average brightness level only in the short time range or an average brightness level only in the long time range.

Vertical amplitude controller 6 for controlling the amplitude of a reference sawtooth wave for vertical deflection on a vertical synch signal as the trigger controls the vertical amplitude substantially simultaneously to a flowing of a beam current according to an output of brightness level detector 5 that corresponds to beam current flowing in picture tube 4 in a manner such that the vertical size of a picture does not change. Similarly, substantially when a beam current flows, horizontal amplitude controller 7 for controlling the horizontal amplitude controls the horizontal amplitude based on an output of brightness level detector 5 according to a beam current flowing in picture tube 4 in a manner such that the horizontal size of a picture does not change. Vertical sawtooth-wave controller 8 controls a linearity of vertical sawtooth-waves and performs an S-character correction, and pin-cushion controller 9 controls a pin-cushion waveform controlled by horizontal amplitude controller 7.

Figure 2A:
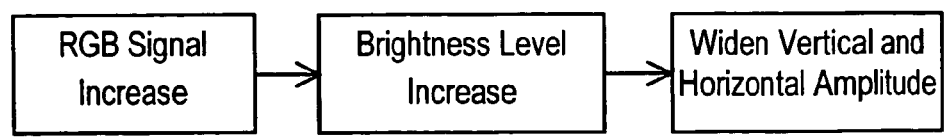
FIG. 2A is a flowchart of an amplitude control of the vertical/horizontal amplitude control device according to the embodiment.
Figure 2B:
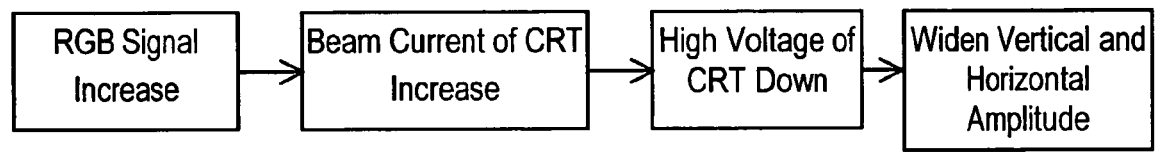
FIG. 2B is a flowchart of an amplitude control of a conventional vertical/horizontal amplitude control device.
Figure 3:
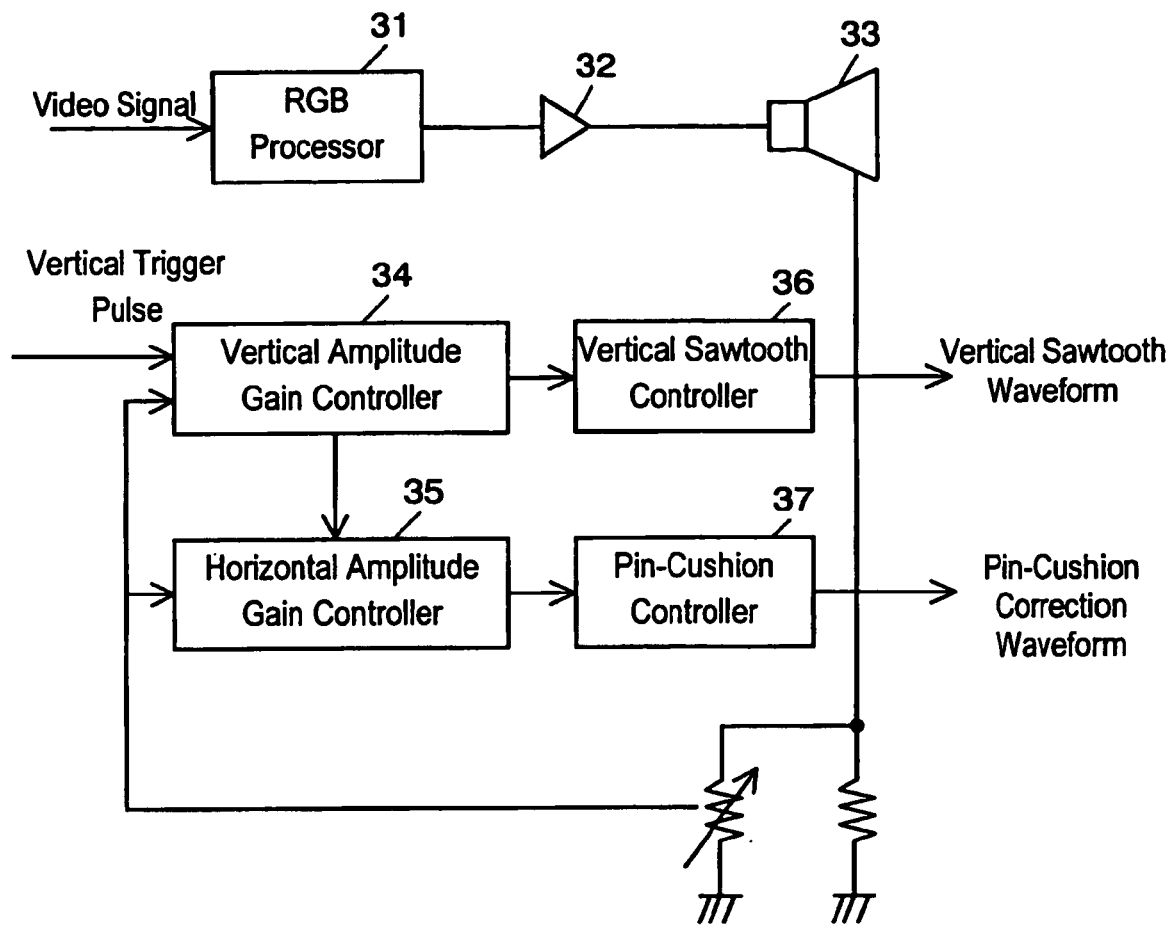
FIG. 3 is a block diagram of the conventional vertical/horizontal amplitude control device.

An operation of the above-mentioned vertical/horizontal control device will be described with reference to FIG. 2A and FIG. 2B. FIG. 2A is a flowchart of high-voltage control of the vertical/horizontal amplitude control device according to the embodiment. FIG. 2B is a flowchart of high-voltage control in a conventional vertical/horizontal amplitude control device. The conventional control device widens vertical and horizontal amplitudes after a high voltage decreases due to an increase of the beam current of the picture tube that is caused by an increase in the brightness level of a signal output. Therefore, the vertical and horizontal amplitudes are not widened by the time they should be widened due to a time loss. That is, the vertical and horizontal amplitudes should be widened simultaneously to the decreasing of the high voltage. As shown in FIG. 2A, the vertical/horizontal amplitude control device of the embodiment detects the brightness level from RGB signals and controls the vertical and horizontal amplitudes based on the brightness level. By predicting a decreasing of the high voltage in advance in this way, the control device of the embodiment prevents the time loss and controls the vertical and horizontal amplitudes rapidly. The conventional control device generates a delay from the decreasing of the high voltage to the controlling of the amplitudes. This causes the picture size to momentarily shrink and then return to a normal size, and has a viewer feel uncomfortable. The control device of the embodiment does not have the viewer feel uncomfortable since not generating the time loss.

As described above in detail, the vertical/horizontal amplitude control device of the embodiment controls the vertical and horizontal amplitudes without the delay even when the brightness level of the video signal changes rapidly.

Figure 4A:
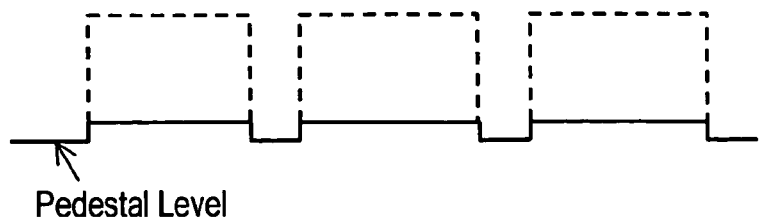
FIG. 4A to FIG. 4F illustrate signal waveforms of the vertical/horizontal amplitude control device according to the embodiment.
Figure 4B:
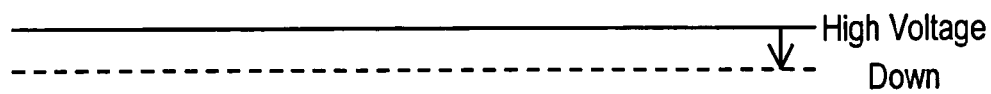
Figure 4C:
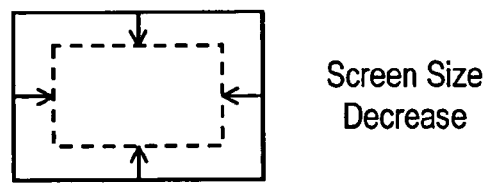
Figure 4D:
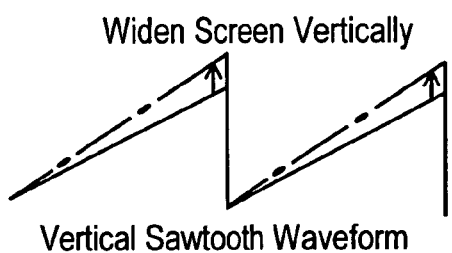
Figure 4E:
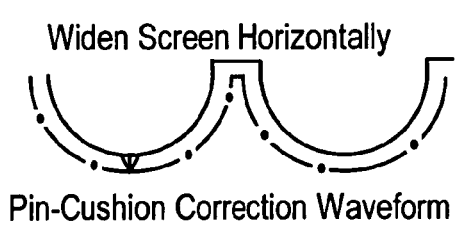
Figure 4F:
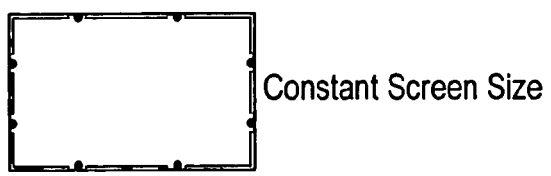

FIG. 4A to FIG. 4F show signal waveforms of the vertical/horizontal amplitude control device of the embodiment. In FIG. 4A, a solid line represents a video signal corresponding to a small brightness level of the output of RGB processor 1. A broken line represents a video signal corresponding to a large brightness level. The larger the brightness level is, the larger a load of high voltage increases, thus causing a decrease of the high voltage. FIG. 4B represents a waveform of the high voltage. As shown in FIG. 4C, when the high voltage decreases, the vertical and horizontal sizes of a picture decrease. According to the present invention, since the brightness level is detected by digital processing, the video signal level can be easily detected and controlled, and the video signal level can be easily transmitted to vertical amplitude controller 6 and horizontal amplitude controller 7 when the video signal is output to the picture tube. As shown in FIG. 4D and FIG. 4F, vertical amplitude controller 6 controls the amplitude of a vertical sawtooth-wave while horizontal amplitude controller 7 controls a DC level of a horizontal pin-cushion correction waveform. As shown in FIG. 4F, the controllers control the vertical and horizontal amplitudes based on the brightness level of the video signal without a time loss and thus maintains a constant picture size independently from the brightness level.

The number of bits of the signal to be transmitted from the brightness level detector to the vertical and horizontal amplitude controllers is at least ten because of the resolution of the vertical amplitude. If the number of bits is small, the change of the vertical amplitude due to the change of the video signal is visible and provides the viewer with an uncomfortable feeling as a change of a digital nature. According to the invention, the amplitudes are controlled through the digital processing, however may be similarly controlled through an analog processing. The vertical and horizontal amplitudes may be controlled in combination with a conventional control device, that is, based on the detected brightness level as well as on the change of the high voltage. Furthermore, the horizontal amplitude may be controlled through the control of the DC level of the pin-cushion correction waveform.

INDUSTRIAL APPLICABILITY

The vertical/horizontal amplitude control device of the present invention controls vertical and horizontal amplitudes of a video display device, such as a cathode-ray tube (CRT), at a constant level without delay from a change of the video signal even in when a brightness level of the video signal abruptly changes.

REFERENCE NUMERALS

1 RGB Processor
2 Delay Circuit
3 Gain Controller
4 Image Display Device
5 Brightness Level Detector
6 Vertical Amplitude Controller
7 Horizontal Amplitude Controller
8 Vertical Sawtooth Waveform Controller
9 Pin-Cushion Controller

The invention claimed is:
1. A vertical/horizontal amplitude control device for controlling a vertical amplitude and a horizontal amplitude which change a vertical size and a horizontal size of an image display device for displaying a video signal, said vertical/horizontal amplitude control device comprising:
a brightness level detector for detecting an average of a brightness level of said video signal and a peak of said brightness level in a vertical deflection period, and an average of a brightness level of said video signal and a peak of said brightness level in a horizontal deflection period;
a vertical amplitude controller for controlling said vertical amplitude in order to change the vertical size of said image display device based on said average of said brightness level of said video signal and said peak of said brightness level in said vertical deflection period; and a horizontal amplitude controller for controlling said horizontal amplitude in order to change the horizontal size of said image display device based on said average of said brightness level of said video signal and said peak of said brightness level in said horizontal deflection period.

2. The vertical/horizontal amplitude control device of claim 1, further comprising
a delay circuit for delaying said video signal supplied to said image display device.

3. The vertical/horizontal amplitude control device of claim 2, wherein,
when said average of said brightness level of said video signal and said peak of said brightness level in said vertical deflection period increases, said vertical amplitude controller widens said vertical amplitude, and
when said average of said brightness level of said video signal and said peak of said brightness level in said horizontal deflection period increases, said horizontal amplitude controller widens said horizontal amplitude.

4. The vertical/horizontal amplitude control device of claim 2, wherein said brightness level detector detects said brightness level by digital processing.

5. The vertical/horizontal amplitude control device of claim 1, wherein said vertical amplitude controller controls said vertical amplitude by controlling an amplitude of a reference sawtooth wave, and said horizontal amplitude controller controls said horizontal amplitude based on said reference sawtooth wave having the amplitude controlled.

6. The vertical/horizontal amplitude control device of claim 5, wherein,
when said average of said brightness level of said video signal and said peak of said brightness level in said vertical deflection period increases, said vertical amplitude controller widens said vertical amplitude, and
when said average of said brightness level of said video signal and said peak of said brightness level in said horizontal deflection period increases, said horizontal amplitude controller widens said horizontal amplitude.

7. The vertical/horizontal amplitude control device of claim 5, wherein said brightness level detector detects said brightness level by digital processing.

8. The vertical/horizontal amplitude control device of claim 1, wherein,
when said average of said brightness level of said video signal and said peak of said brightness level in said vertical deflection period increases, said vertical amplitude controller widens said vertical amplitude, and
when said average of said brightness level of said video signal and said peak of said brightness level in said horizontal deflection period increases, said horizontal amplitude controller widens said horizontal amplitude.

9. The vertical/horizontal amplitude control device of claim 1, wherein said brightness level detector detects said brightness level by digital processing.

* * * * *